BALL-HOLDING ELECTRIC RECEPTACLE BOARD

Filed Dec. 19, 1963 6 Sheets-Sheet 1

INVENTOR.
SIDNEY FRANKLIN
BY
ATTORNEY

INVENTOR.
SIDNEY FRANKLIN
BY [signature]
ATTORNEY

BALL-HOLDING ELECTRIC RECEPTACLE BOARD

Filed Dec. 19, 1963 6 Sheets-Sheet 3

INVENTOR.
SIDNEY FRANKLIN
BY
ATTORNEY

INVENTOR.
SIDNEY FRANKLIN
BY [signature]
ATTORNEY

BALL-HOLDING ELECTRIC RECEPTACLE BOARD

Filed Dec. 19, 1963 6 Sheets-Sheet 5

INVENTOR.
SIDNEY FRANKLIN
BY
ATTORNEY

Jan. 24, 1967 S. FRANKLIN 3,300,217

BALL-HOLDING ELECTRIC RECEPTACLE BOARD

Filed Dec. 19, 1963 6 Sheets-Sheet 6

INVENTOR.
SIDNEY FRANKLIN

BY

ATTORNEY

United States Patent Office 3,300,217
Patented Jan. 24, 1967

3,300,217

BALL-HOLDING ELECTRIC RECEPTACLE BOARD

Sidney Franklin, Lawrence, N.Y., assignor to Metro Game Manufacturing Corp., Long Island City, N.Y., a corporation of New York Filed Dec. 19, 1963, Ser. No. 331,686
10 Claims. (Cl. 273—135)

The present invention relates to a Ping-pong ball electric switch holder and it particularly relates to a Ping-pong board electric switch holder which may be used in connection with a flash board to indicate the spaces which have been called and selected to a large group or assembly and which is particularly to be used in connection with bingo.

The present invention will be particularly described in its application to bingo games in which the successive numbers to be called are ascertained by means of selection of Ping-pong balls held in a revolving device or presented to the number caller by means of a blower arrangement in which the group of Ping-pong balls carrying the various bingo numbers are blown around and are selected one after another and then placed in a suitable receptacle where the number is recorded and desirably flashed on a large illuminated board.

It is among the objects of the present invention to provide a novel holder board arrangement to be utilized to actuate a flash board, which holder board arrangement will receive and hold the Ping-pong balls and hold them firmly in position while actuating an illuminated electric flash board.

A further object of the present invention is to provide a reliable table type holder board, in the form either of a table or shelf, which will permit ready insertion of the selected numbered Ping-pong balls and which will assure an automatic electrical circuit being established, leading to a flash board.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, according to a preferred embodiment of the present invention, the balls are held in position by resilient members taking the form either of leaf springs or coiled springs and positioned above the maximum diameter of the ball so as to bias the Ping-pong ball downwardly.

Preferably, the lower part of the ball and desirably the bottom of the ball will be pressed down against a double parallel leaf spring arrangement, which will cause the two leaf springs to contact each other and establish an electric circuit to a scoreboard.

In the preferred arrangement, two parallel coiled springs are utilized, which permit ready passage of the balls and at the same time will hold them down securely and permit ready release of the balls after the game has been completed.

The ball release device desirably consists of oscillating or laterally moving members which will displace the ball from the switch elements or double leaf spring elements and permit the ball to be dropped into a funnel, sheet or discharge chamber which will discharge the balls back into a collection member, where they may be re-circulated by an air blast, or even re-circulated by a rotatable cage for either manual or automatic operation.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figures 1, 2:
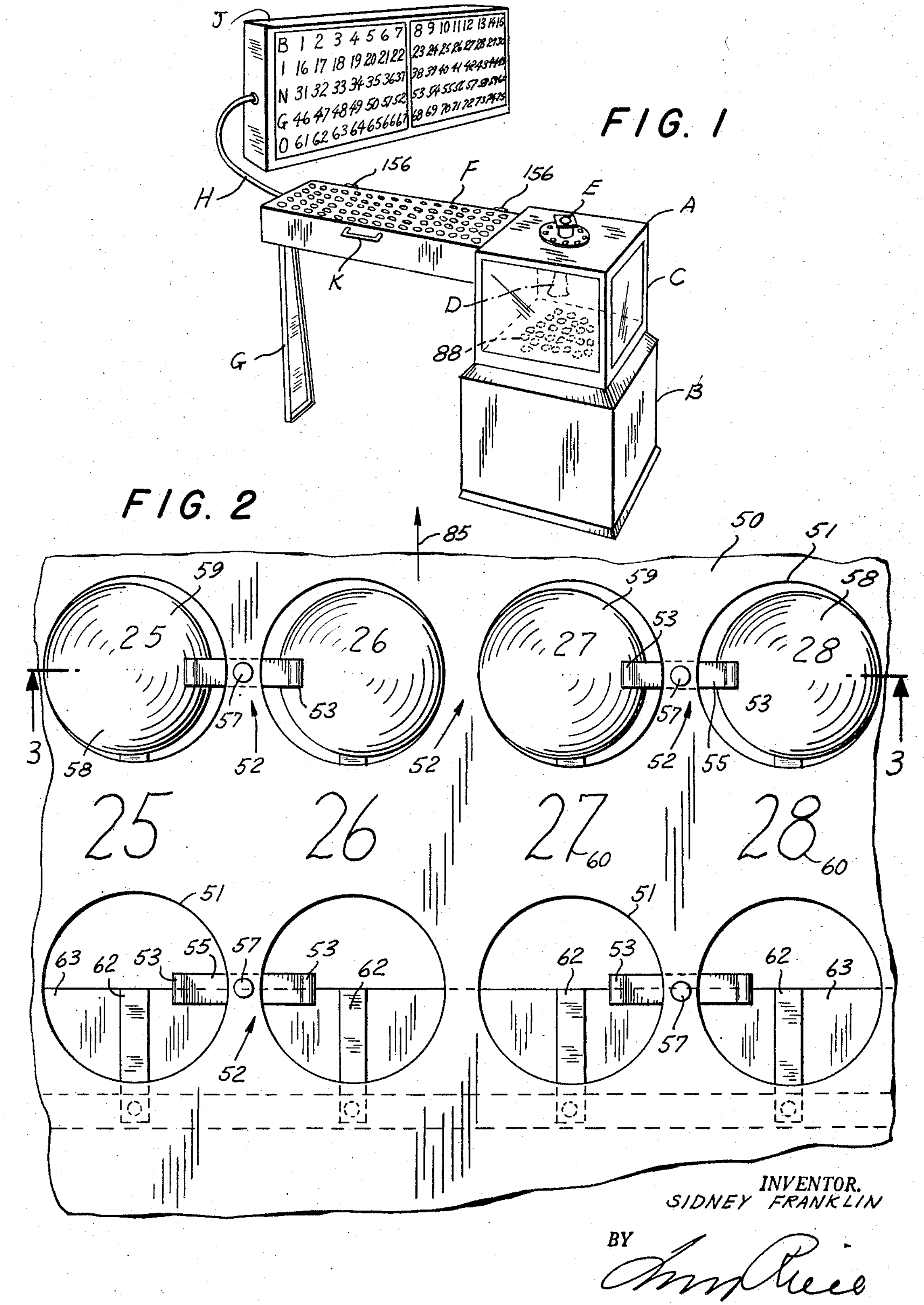
FIG. 1 is a top perspective view of a combination of air ball blower arrangement with a receptacle, automatic electric circuit closer arrangement, and an illuminated electric scoreboard.
FIG. 2 is a fragmentary top plan view of a typical receptacle automatic contact board, showing some of the balls in position and some of the receptacle openings empty, without balls therein.

Referring to FIG. 1, there is shown a floor model of a numbered Ping-pong ball blower arrangement.

The base B will contain a high powered electric fan or blower, which will blow the balls around in the ball receptacle C.

Balls, at one a time, will be blown into the funnel D and presented to the number caller at the upper end opening E of the funnel D above the top of the transparent casing C enclosing the circling balls.

These balls are then selected and placed in the openings in the table or shelf F.

This table or shelf F is supported at one side by the floor table model A and at the other side by the swinging leg G.

The various recesses in the table top F communicate by means of electrical cable connections H to the automatic electric flash board J.

Normally, the vacuum jet action created within the transparent walled casing C will thoroughly mix the balls with complete visibility to the players.

The feature of the present invention resides in the fact that each ball, when it is removed from the top of the funnel at E, may be forthwith placed in the correspondingly numbered opening in the table top receptacle F followed by a flash of the appropriate number on the board J, where it will stay illuminated until the game is completed or one of the players has succeeded in reaching bingo and has won the usual prize.

The present invention will be particularly directed to the table top arrangement F.

Normally, this table top arrangement may be independently operable and is provided with the handle K enabling it to be carried after the leg G and the floor model blower A have been attached.

The table F of course may also be utilized if desired, with a rotating metal bingo cage from which the balls may be selected by hand or from which the balls may be discharged one by one as the cage is rotated.

Referring particularly to the board structure, as shown in FIGS. 2 to 5, the receptacle board has a top plate 50 having a plurality of openings 51 arranged in rows.

The portions between the openings in the horizontal rows, as indicated at 52, will carry the double spring elements 53.

These double spring elements have in-turned coiled ends 54 and oblique stop legs 55 which extend up through and contact the side edges of the openings 51.

The connecting members 56 of the legs 55 are held in position by means of the rivets 57.

The coiled ends 54 will press down upon the Ping-pong balls 58, each of which carry an appropriate number, as indicated at 59, corresponding to the number marked on the table, as indicated at 60. (See particularly FIG. 2).

The coiled ends 54 will press down upon the Ping-pong downward of the balls, as indicated by the arrows 61, and the balls will be held down against the upper switch elements 62, pressing them against the lower switch elements 63. (See FIGS. 4 and 5).

Both the upper and lower switch elements will be mounted upon the plastic insulating block 64 upon the step structure 65 and they will be held in position by the pins 66 and 67.

Figures 4, 5:
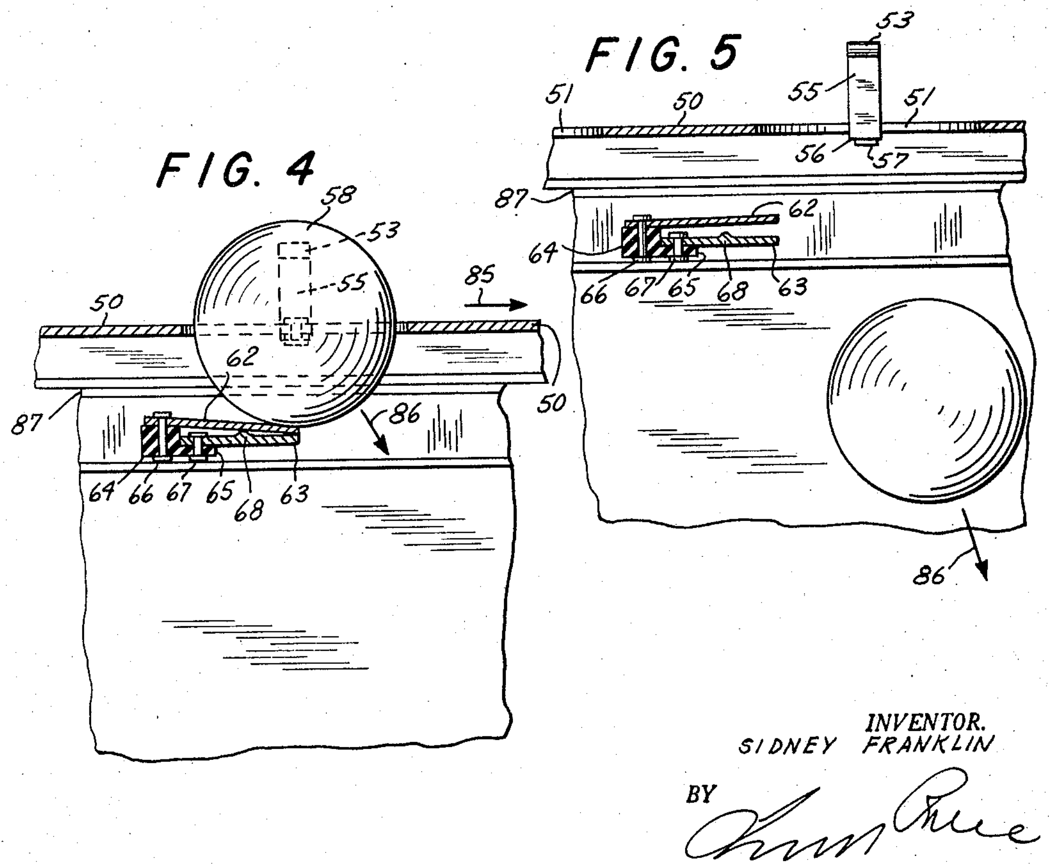
FIG. 4 is a transverse vertical sectional view upon the line 4—4 of FIG. 3.
FIG. 5 is a transverse vertical sectional view similar to FIG. 4, indicating how the balls may be discharged away from the receptacle openings and away from the contact switches to start the game anew.

The contact members as indicated have the separated upper fingers 62, whereas the lower continuous contact switch 63 will have the enlargement or ridge 68 to establish a satisfactory contact, as shown in FIG. 4, with the spring elements 55 presenting the balls 58 downwardly.

It will be noted by reference to FIG. 2 that these fingers 62 will project transversely of the spring elements 55 and over and across the continuous strip 63.

Each time a ball is inserted in the opening 51, this will result in establishing a circuit across the spring finger 62 and 63, which will be communicated through the cable H to light up the corresponding number upon the electrically illuminated scoreboard J, each number on said scoreboard having a light to the rear of that number which will be in separate electrical circuit with one of the fingers 62.

When the game has been completed and bingo has been scored, by moving the top plate 50 in the direction of the arrow 85 the balls 58 will be released off the spring fingers 62 and beyond the strip 61 and will be permitted to fall as indicated by the arrow 86 in the lower portion 87 of the shelf or receptacle F and return into the lower portion of the chamber C, as indicated at 88.

This arrangement, as shown in FIGS. 2 to 5, will permit ready receiving of said Ping-pong balls and will permit such balls to be held down against the spring fingers 62 and 63 and at the same time will permit ready release thereof when the game is over by moving the table top 60 in the direction 85.

A suitable sliding connection for the table top is indicated at 87.

Figure 6:
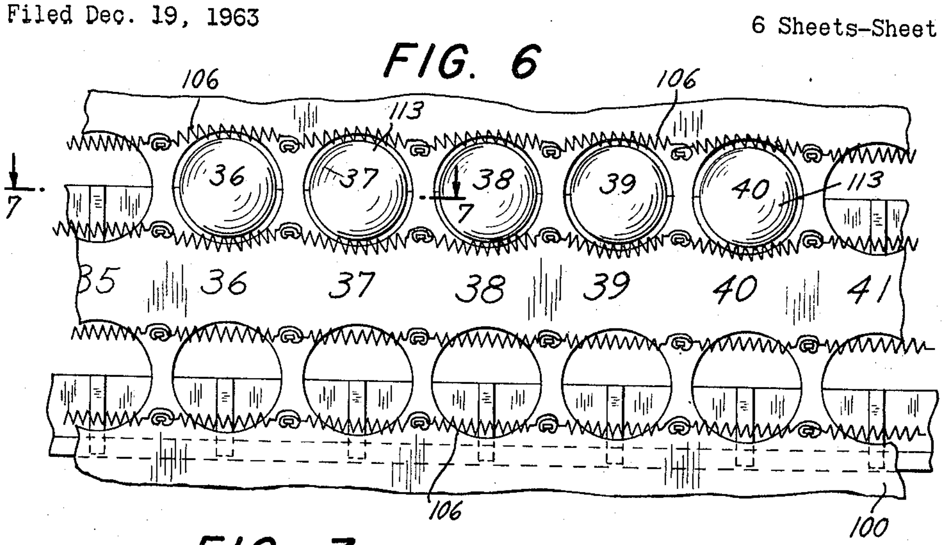
FIG. 6 is a fragmentary top elevation view of an alternative arrangement in which parallel elongated coiled springs are utilized in lieu of the leaf springs of FIGS. 2 to 5.
Figure 7:
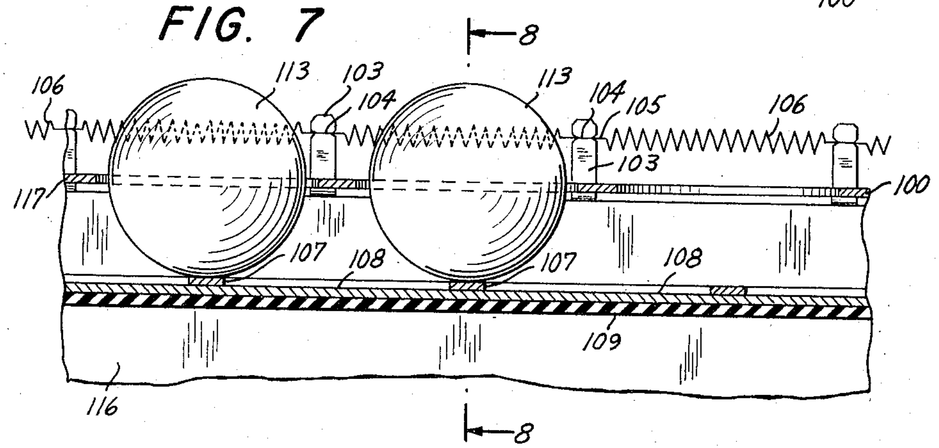
FIG. 7 is a transverse vertical side sectional view upon an enlarged scale as compared to FIG. 6 and upon the line 7—7 of FIG. 6.
Figure 8:
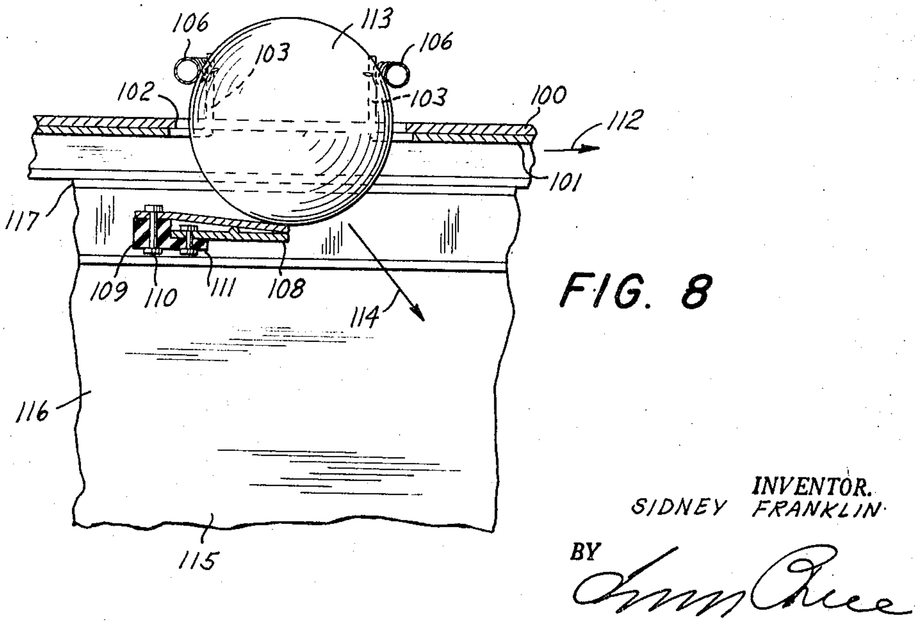
FIG. 8 is a transverse vertical sectional view upon the line 8—8 of FIG. 7, showing the switch arrangement.

In the alternative arrangement shown in FIGS. 6 to 8, the table top 100 is provided with an under-plate 101 from which extend upwardly through the tabletop the opposite parallel legs 103.

These legs 103 have notched portions indicated at 104 for receiving the ends 105 of the parallel rows of coiled springs 106.

The balls may be readily inserted between the opposite pairs of springs 106 and the balls will then be pressed downwardly by said springs against the upper movable leaf contacts 107.

These leaf contacts 107 are held directly above the contact switch 108 and each is mounted upon the insulating block 109.

The contact elements 107 and 108 are respectively mounted by the rivets or pins 110 and 111 on said contact block.

The structure 101 may be moved after the game is completed as indicated by the arrow 112, to release the Ping-pong balls 113 from the top of the leaf spring elements 107, whereupon the balls will be discharged as indicated at 114 into the lower portion 115 of the table 116, and the structure 100 moves as the structure 101 is moved.

From here the balls will either roll or be moved into a rotatable cage.

This arrangement also has the sliding arrangement or guiding arrangement 117 to permit movement of the balls.

In the embodiment of FIGS. 6, 7 and 8, the balls will be held down by the pairs of parallel coiled springs 106, between which the balls may be inserted, and the movement of the plate element 101 will quickly and readily release these balls to fall in the direction of arrow 114.

Referring to the embodiment of FIGS. 9 to 11, the balls may be held down by the leaf springs of FIGS. 3 to 5 but preferably are held down by the coil springs of FIGS. 6 to 8 and/or desirably the coil springs will be described in connection with FIGS. 12 to 15.

Figure 3:
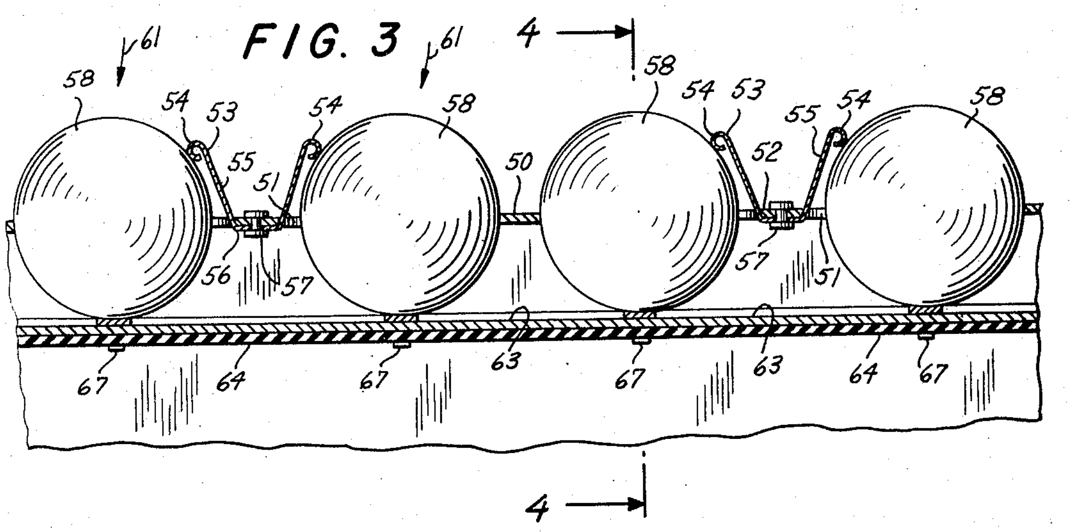
FIG. 3 is a fragmentary transverse sectional view upon the line 3—3 of FIG. 2.
Figure 9:
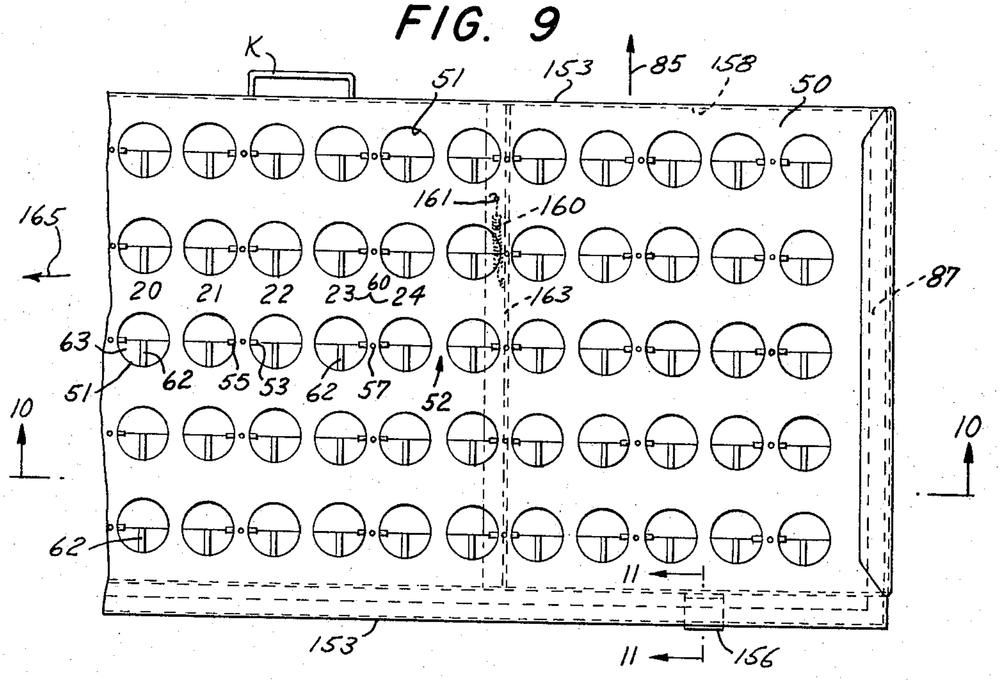
FIG. 9 is a top plan view illustrating a board arrangement in which the top of the board may be moved so as to release the balls.

As shown in FIG. 9, the boards 50 may have the openings 51 to receive the Ping-pong balls 58 as shown in FIGS. 3 and 4.

When these Ping-pong balls are received therein, they will close the switches indicated at 62–63 in FIGS. 4 and 5.

These boards 50 may be provided with the rows of numbers as indicated at 60, and they also may have the spring members 53, 54 and 55 which fit over each ball and hold it down against the switch.

Each Ping-pong ball as it is selected and inserted will be forced into the corresponding opening 51 corresponding to the number on the ball and at the same time close the switch and illuminate the number on the electric flash board J.

Figure 10:
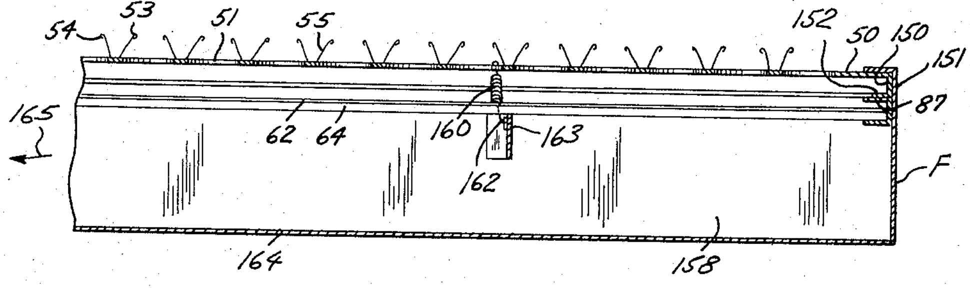
FIG. 10 is a transverse sectional view taken upon the line 10—10 of FIG. 9.
Figure 11:
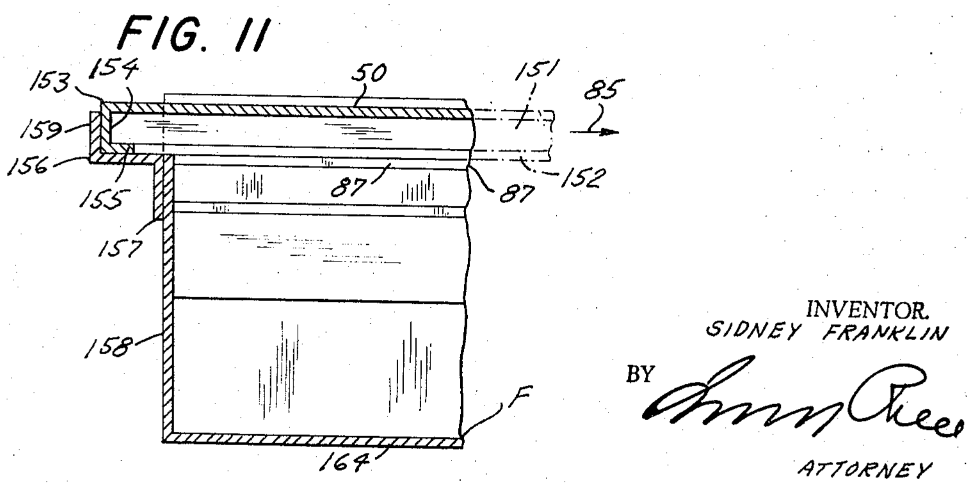
FIG. 11 is a fragmentary transverse sectional view taken upon the line 11—11 of FIG. 9 and upon an enlarged scale as compared to FIG. 9.

The showing of FIGS. 9 to 11 particularly illustrates the manner in which the balls are released.

It will be noted that the board 50 carrying the openings 51 has the downturned side flange portions 150 which fit closely against the side walls 151 of the enclosure.

These side walls 150 have the inturned flange 152 which slides upon the U-cross section member 87 which forms a sliding support and which may be welded or otherwise attached to the side wall of the housing or table F.

The ends 153 of the reciprocating table 50 also are provided with downturned flange portions 154 and inturned flanges 155.

The end portion at the side opposite the handle K will have an angular stop member 156 which has a downturned flanged 157 welded or otherwise connected to the wall 158 of the housing F and with an upturned flange 159 which will act as a stop against the flange 154 at the end of the table 50 opposite the handle K.

The spring 160 which will be engaged in an opening 161 in the top plate 50 will tend to bias or pull the top plate 50 or table in the direction opposite the arrow 85.

The lower end of the spring is connected at 162 to the plate 163 which extends across the housing F between the walls 158.

When the top plate or table 50 is moved or pulled in the direction 85 against the spring 160, the balls will be moved off the switches 62 and will be permitted to drop as indicated by the arrows 86 in FIGS. 4 and 5 into the lower part of the housing F, and they will roll along the bottom wall 164 thereof until they are discharged into the casing C from the open lower end of the table top receptacle.

Desirably, the table top arrangement F is inclined slightly toward its open end in the direction 165 in FIGS. 9 and 10 so that the balls will readily roll down toward the casing C and collect as indicated at 88.

As soon as the balls have been released, the handle K may enable the top plate or table top 50 to be moved back in position against the stop 156 or the spring 160 will automatically move it back into such position.

In the embodiment shown in FIGS. 12 to 15 which is the preferred embodiment, the pairs of coil springs M which hold the Ping-pong ball in position against the switch P are located transversely of their position as shown in FIGS. 6 to 8.

The movable table top or board Q is slidably supported upon the housing or table R.

Specifically, the table or enclosure structure has the side walls 200 and 201, the oblique side bottom walls 202 and 203, and the bottom wall 204.

The bottom wall 204 may be welded in position against the side walls against the flanges 205 and 206.

The main housing will have the bottom 207.

The ends of the interior false bottom 204 may also be oblique as indicated at 207 and welded by the flange 208 to the end wall 209 of the housing R.

The side walls 200 and 201 will also carry the cross bars 210 which are held in position at the end by screws 211.

The channel members 212 are held in position by the screws or bolts 213 to the cross bars 210.

On the top portions 214 of the inverted channel members 212 are clamped the switch elements P by the double nuts 215.

These switch elements consist of heads 216 which are reciprocatory having the concavity 217 to contact the lower face of the ball and to be pressed down to close a microswitch element 218 having the contact leads 219 which are connected together to a common ground of the conduit wire at one side and to the other side individually to the various lamps or illuminating devices arranged on the flashboard J.

The head member 216 will normally be reciprocal and spring pressed upwardly so as to make contact with the Ping-pong ball N when it is pressed downwardly thereon.

Figure 14:
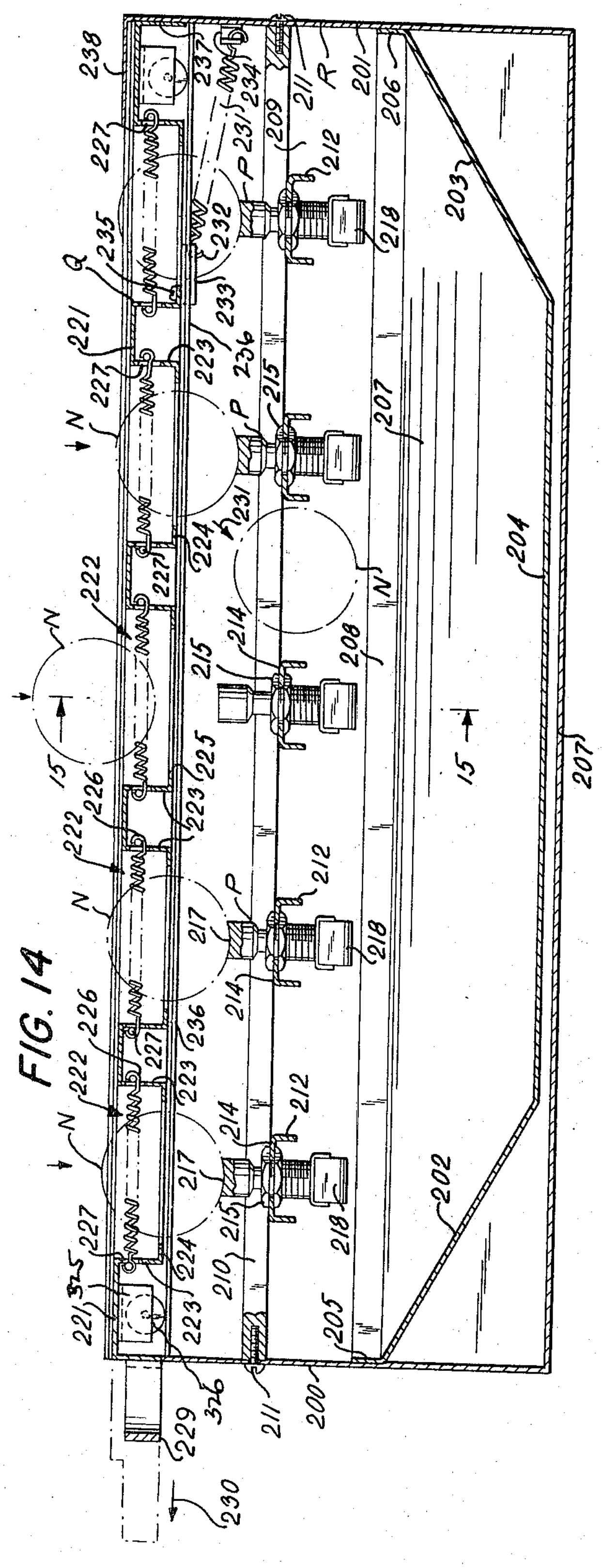
FIG. 14 is a transverse vertical sectional view taken upon the line 14—14 of FIG. 12 and upon an enlarged scale as compared to FIG. 12.

The table top 221 will have a plurality of channels 222 formed therein which have side walls 223 and bottom walls 224 (see FIG. 14).

The bottom walls 224 have a series of openings 225 through which the Ping-pong balls may be inserted, which openings are slightly wider than the diameter of the Ping-pong balls.

Across each opening are positioned parallel coil springs M as shown in FIGS. 12 to 15 with the springs being spaced apart so that their spacing will be much less than the diameter of the hole or opening 225 at the bottom of the channels 222.

Figure 13:
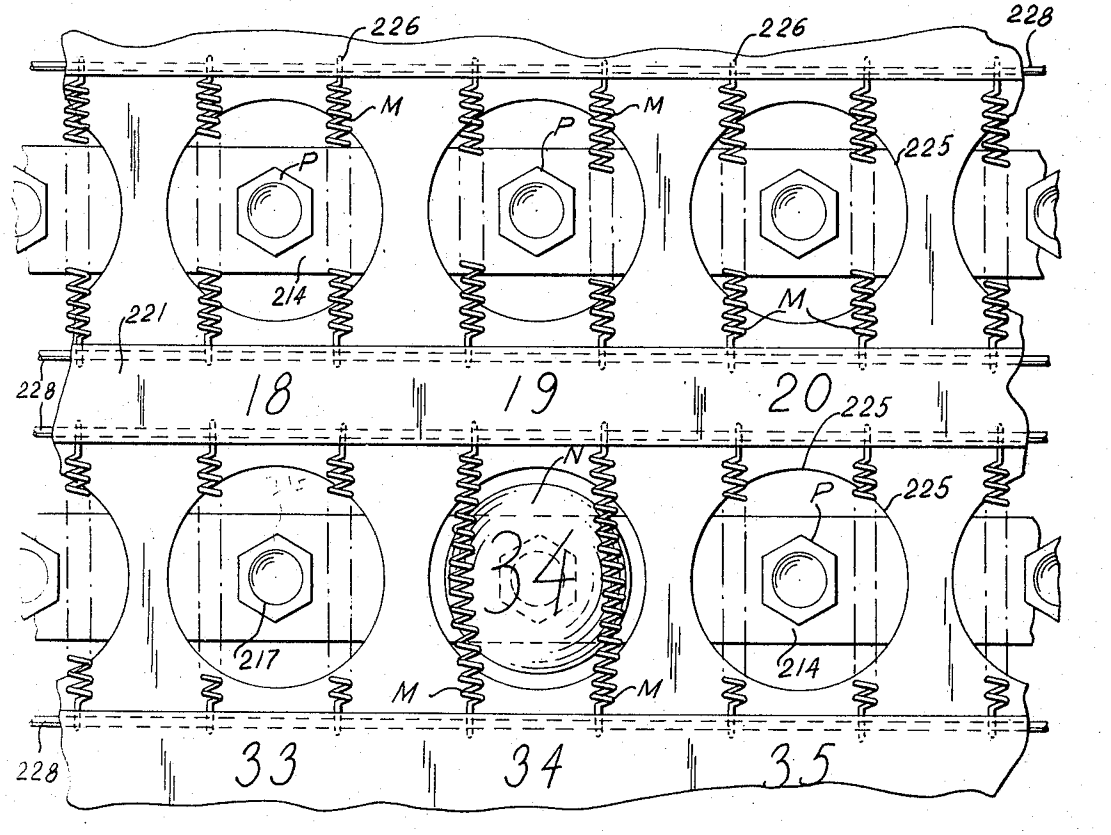
FIG. 13 is a fragmentary top plan view similar to FIG. 12 and upon an enlarged scale as compared to FIG. 12.

The ends 226 of these springs will project through openings 227 in the side walls 223 of the channels 222 (see FIG. 14), and they will be coiled and held in position by means of the rods 228 (see FIGS. 13 and 14).

The rods 228 may be inserted through the ends 226 of the springs M to hold all of the springs in position and the rods upon being withdrawn may release all these springs making assembly and disassembly quite easy.

One side of the table top Q is provided with the handle 229 which may be pulled in the direction 230 to release the Ping-pong balls N so that they will fall as indicated by the arrow 231 in FIG. 14 onto the bottom 204 and then be turned back to the casing C at one end of the table top arrangement or enclosure R.

The spring 231 will normally bias the table top Q in a direction opposite the arrow 230.

This spring 231 is connected at the end 232 to the angular member 233 on the table top at one end and to the angle member 234 on the side wall 201 at its other end.

The angle member 233 is held in position by means of the screw 235.

The table top Q will slide on the ledges 236 forming a guideway therewith and will be stopped by the extension 237 with the top flange 238 when it is pulled back by the spring 231.

On the device as shown in FIGS. 12 to 15, the Ping-pong balls N when selected will be pressed into the channel 222 between the spring M and by these springs M they will be forced down against the recessed top portion 217 of the head 216 of the reciprocating switch element P.

This will close the circuit through the ground line 219 as well as separate lines which lead to the position shown upon the tote board or signal board J as indicated in FIG. 1.

When the game has been completed and bingo has been scored, by pulling out the sliding board Q, the balls N may be released, and they will fall down onto the bottom 204 and then run back into the casing C.

The springs M are so regulated as to apply a slight downward pressure upon the sides of the balls and force them down against the reciprocal elements P from which they may be readily released by a movement 230 of the board Q.

The microswitch element 218 which is embedded in plastic may be of the micro switch variety actuated by the slight movement of the reciprocal switch P.

The coil springs M may be readily assembled and it is assembled by means of the rods 228 and the channels 222 which will readily enable the balls to be inserted into the openings 225.

It is thus apparent that the applicant has provided a bingo ball playing system which enables the balls themselves to automatically score the game and also permits ready release of the balls when any one game has been completed.

The switch arrangement may be varied and is diagrammatically shown at 218, but it is obvious that any light contact switch may be employed.

Figure 15:
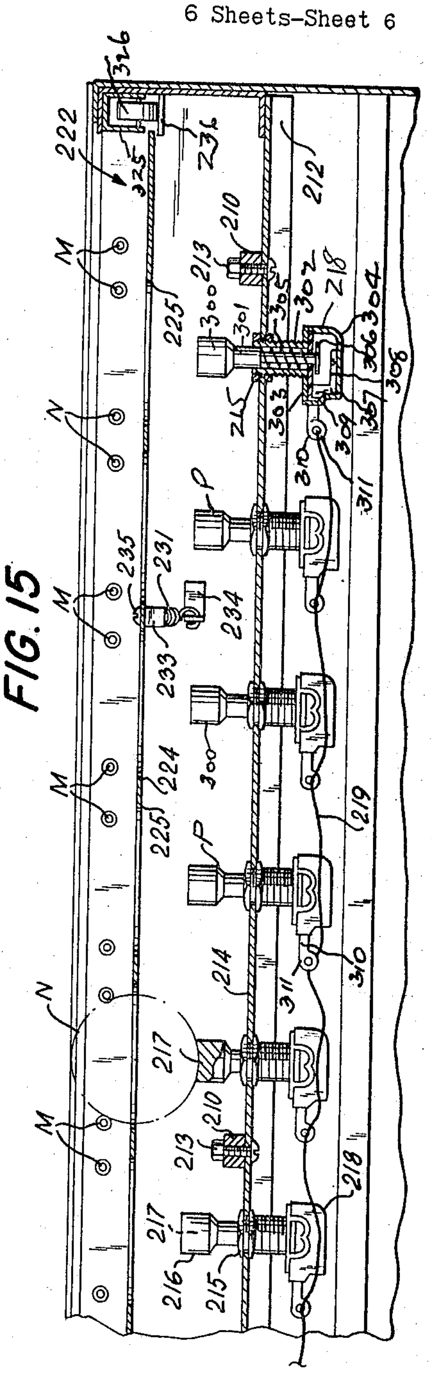
FIG. 15 is a fragmentary transverse vertical sectional view taken upon the line 15—15 of FIG. 14.

Specifically the switch P which is shown in section at the right of FIG. 15 has an enlarged head 300 with a reduced diameter portion 301 which telescopes in the threaded sleeve 302.

This threaded sleeve is held in position by the nuts 215 and in turn its lower end is threaded into the cover 303 of the plastic box or enclosure 304 forming part of the switch 218.

The spring 305 will normally bias the head upwardly so that its contact disk 306 will be out of contact with the right angular switch element 307.

The right angular switch element 307 has a contact leg 308 resting on the floor of the plastic box 304 and a side leg 309 which has a projection 310 through the side of the box.

The ends of the projections 310 have the eyes 311. These eyes may each have a separate connection in the conduit 219 to the signal board J.

Referring to FIGS. 14 and 15, it will be noted that the sides of the table top 221 have depending U-shaped members 325 which may be welded to or otherwise attached to top 221 as they carry the rollers 326 which ride on the ledges or guideway 236.

Figure 12:
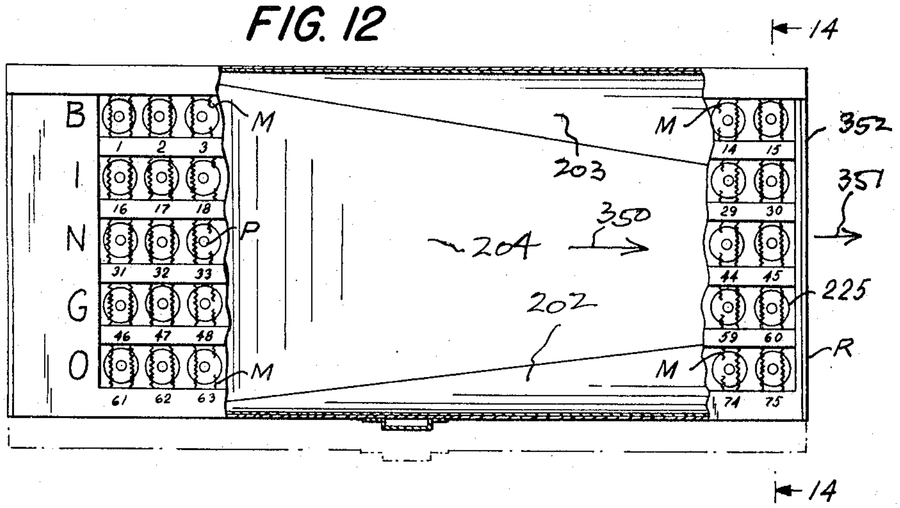
FIG. 12 is a top plan view of an alternative arrangement in which the parallel springs to hold the Ping-pong balls in position extend transversely instead of parallel to the long dimension of the board as shown in FIGS. 6 to 8.

Referring to the bottom wall structure 202, 203 and 204, it will be noted by reference to FIG. 12 that the oblique walls widen in the direction 350 whereas the bottom wall 204 becomes narrower to cause the balls to discharge through a right side opening in the wall 352 as indicated by the arrow 351 into the casing C.

As many changes could be made in the above Ping-pong ball electric switch holder, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An automatic numbered Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are to be inserted, switches within said receptacle board and accessible through said openings, said switches including switch elements acting as bottom stops for the inserted Ping-pong balls, said receptacle board further including resilient means to hold said balls against the switch elements and maintain said switches in closed position, and release means to release the balls from the resilient means and switch elements when the game has been played.

2. An automatic numbered Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are to be inserted, switches within said receptacle board and accessible through said openings, said switches including switch elements acting as bottom stops for the inserted Ping-pong balls, said receptacle board further including resilient means to hold said balls against the switch elements and maintain said switches in closed position, and release means to release the balls from the resilient means and switch elements when the game has been played, said resilient means consisting of parallel rows of closely spaced elongated coiled springs spaced apart less than the maximum diameter of the balls and pressing downwardly upon the upper sides of the balls.

3. An automatic numbered Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are to be inserted, switches within said receptacle board and accessible through said openings, said switches including switch elements acting as bottom stops for the inserted Ping-pong balls, said receptacle board further including resilient means to hold said balls against the switch elements and maintain said switches in closed position and release means to release the balls from the resilient means and switch elements when the game has been played, said resilient means consisting of obliquely upwardly extending resilient leaf spring arms with coiled upper ends arranged in pairs with the upper ends spaced a lesser distance apart than the maximum diameter of the balls and designed to extend over and contact the upper sides of the balls to press them down against the switch elements.

4. An automatic numbered Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are to be inserted, switches within said receptacle board and accessible through said openings, said switches including switch elements acting as bottom stops for the inserted Ping-pong balls, said receptacle board further including resilient means to hold said balls against the switch elements and maintain said switches in closed position, and release means to release the balls from the resilient means and switch elements when the game has been played, said switch elements consisting of a basic single contact switch strip mounted on an insulating block and a plurality of leaf spring contact elements positioned above said strip and under each opening and extending half way across the diameter of the opening and also extending transversely to said resilient means.

5. An automatic numbered Ping-pong ball electric receptacle board for bingo games of the type having numbered Ping-pong balls and having an auxiliary elevated illuminated scoreboard and connecting circuitry between the receptacle board and the illuminated scorebord, said receptacle board having a top plate with transversely aligned rows of numbered openings into which the numbered Ping-pong balls are inserted, switches within said receptacle board and accessible through said openings, said switches including switch elements acting as bottom stops for the inserted Ping-pong balls, said receptacle board further including resilient means to hold said balls against the switch elements and close said switches and release means to release the balls from the switch elements when the game has been played, said release means moving said balls to the side, off said switch elements to permit the balls to drop away from the switch elements.

6. An automatic Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are inserted, switches within said receptacle board and accessible through said openings, said switches including switch elements acting as bottom stops for the inserted Ping-pong balls, said receptacle board further including resilient means to hold said balls against the switch elements and close said switches and release means to release the balls from the switch elements when the game has been played, said release means moving said balls to the side, off said switch elements to permit the balls to drop away from the switch elements, said resilient means including a plurality of parallel coil springs positioned in pairs across said numbered openings and spaced apart less than the diameter of said openings and less than the diameter of said Ping-pong balls.

7. An automatic Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are inserted, switches within said receptacle board and accessible through said openings, said switches including switch elements acting as bottom stops for the inserted Ping-pong balls, said receptacle board further including resilient means to hold said balls against the switch elements and close said switches and release means to release the balls from the switch elements when the game has been played, said release means moving said balls to the side, off said switch elements to permit the balls to drop away from the switch elements, said top plate having a plurality of spaced depressed channels, said aligned openings being located therein at the bottoms of the channels, said channels having side walls and said resilient means including parallel springs with their ends being engaged to said side walls.

8. An automatic Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are inserted, switches within said receptacle board and accessible through said openings, said switches including switch elements acting as bottom stops for the inserted Ping-pong balls, said receptacle board further including resilient means to hold said balls against the switch elements and close said switches and release means to release the balls from the switch elements when the game has been played, said release means moving said balls to the side, off said switch elements to permit the balls to drop away from the switch elements, said switch elements consisting of reciprocatory vertical contact elements having top recess portions for receiving the bottoms of the balls.

9. An automatic Ping-pong ball electric receptacle board for bingo games of the type having numbered Ping-pong balls and having an auxiliary elevated illuminated scoreboard and connecting circuitry between the receptacle board and the illuminated scoreboard, said receptacle board having a top plate with transversely aligned rows of numbered openings into which the numbered Ping-pong balls are inserted, switches within said receptacle board and accessible through said openings, said switches including switch elements acting as bottom stops for the inserted Ping-pong balls, said receptacle board further including resilient means to hold said balls against the switch elements and close said switches and release means to release the balls from the switch elements when the game has been played, said release means moving said balls to the side, off said switch elements to permit the balls to drop away from the switch elements, said switch elements including micro switch portions actuated by the pressure of the balls against the switch elements.

10. An automatic numbered Ping-pong ball electric receptacle board for bingo games of the type having numbered Ping-pong balls, said receptacle board having numbered openings into which the numbered Ping-pong balls are to be inserted, switches within said receptacle board and accessible through said openings, said switches including switch elements acting as bottom stops for the inserted Ping-pong balls, said receptacle board further including resilient means to hold said balls against switch elements and maintain said switches in closed position, and release means to release the balls from the resilient means and switch elements when the game has been played.

References Cited by the Examiner

UNITED STATES PATENTS

| | | | |
|---|---|---|---|
| 2,591,869 | 4/1952 | Quimby | 273—135 |
| 2,594,434 | 4/1952 | Hofsetz | 273—135 |

FOREIGN PATENTS

| | | |
|---|---|---|
| 492,196 | 4/1953 | Canada. |

RICHARD C. PINKHAM, *Primary Examiner.*

F. BARRY SHAY, *Examiner.*